United States Patent
Bunsmann et al.

(10) Patent No.: US 7,506,915 B2
(45) Date of Patent: Mar. 24, 2009

(54) MOTOR VEHICLE WITH A HATCHBACK AND OPENING ROOF PART

(75) Inventors: Winfried Bunsmann, Bissendorf (DE); Olaf Weissmüller, Bramsche (DE); Udo Heselhaus, Ibbenbüren (DE)

(73) Assignee: Wilhelm Karmann, GmbH, Osnabruck (DE)

( * ) Notice: Subject to any disclaimer, the term of this patent is extended or adjusted under 35 U.S.C. 154(b) by 0 days.

(21) Appl. No.: 10/573,690

(22) PCT Filed: Sep. 17, 2004

(86) PCT No.: PCT/DE2004/002086

§ 371 (c)(1),
(2), (4) Date: Apr. 3, 2007

(87) PCT Pub. No.: WO2005/032869

PCT Pub. Date: Apr. 14, 2005

(65) Prior Publication Data

US 2007/0273175 A1    Nov. 29, 2007

(30) Foreign Application Priority Data

Sep. 30, 2003   (DE)  ................................ 103 45 276

(51) Int. Cl.
*B60J 7/20*   (2006.01)
(52) U.S. Cl. ................................ 296/107.08
(58) Field of Classification Search ............ 296/107.08, 296/146.8
See application file for complete search history.

(56) References Cited

U.S. PATENT DOCUMENTS

| | | | |
|---|---|---|---|
| 1,799,050 A | 3/1931 | Kuturlash | |
| 4,630,858 A * | 12/1986 | Bez | .......................... 296/146.8 |
| 4,674,788 A | 6/1987 | Ohmura et al. | |
| 5,120,105 A | 6/1992 | Brin et al. | |
| 5,141,281 A | 8/1992 | Eger et al. | |
| 5,876,088 A | 3/1999 | Spears | |
| 6,086,958 A | 7/2000 | Russell et al. | |
| 6,250,707 B1 | 6/2001 | Dintner et al. | |

(Continued)

FOREIGN PATENT DOCUMENTS

DE    10159390 C1    11/2002

(Continued)

OTHER PUBLICATIONS

"Hatchback", Wikipedia, the free encyclopedia, pp. 1-6, http://en.wikipedia.org/wiki/Hatchback.*

*Primary Examiner*—Dennis H Pedder
(74) *Attorney, Agent, or Firm*—Howrey LLP

(57) ABSTRACT

A motor vehicle (1) with a hatchback (H1) comprising lateral frame parts (H3) rising in the direction of travel, between which in a rear window (H4) is received in at least one position and which rest on a rear section (8) of lateral members of the bodywork of the vehicle (6) when the hatchback (H1) is in a closed position, forming part of the outer surface of the vehicle. According to the invention, when the hatchback (H1) is opened, it can be moved with the most forward-lying area (HF) thereof counter to the direction of travel (F) and a passageway (D1) enabling the roof parts (P1;P2;H4) to move inside the bodywork of the vehicle (6) is opened up in the overlapping area when the hatchback (H1) is closed.

5 Claims, 18 Drawing Sheets

U.S. PATENT DOCUMENTS

Figure 1:
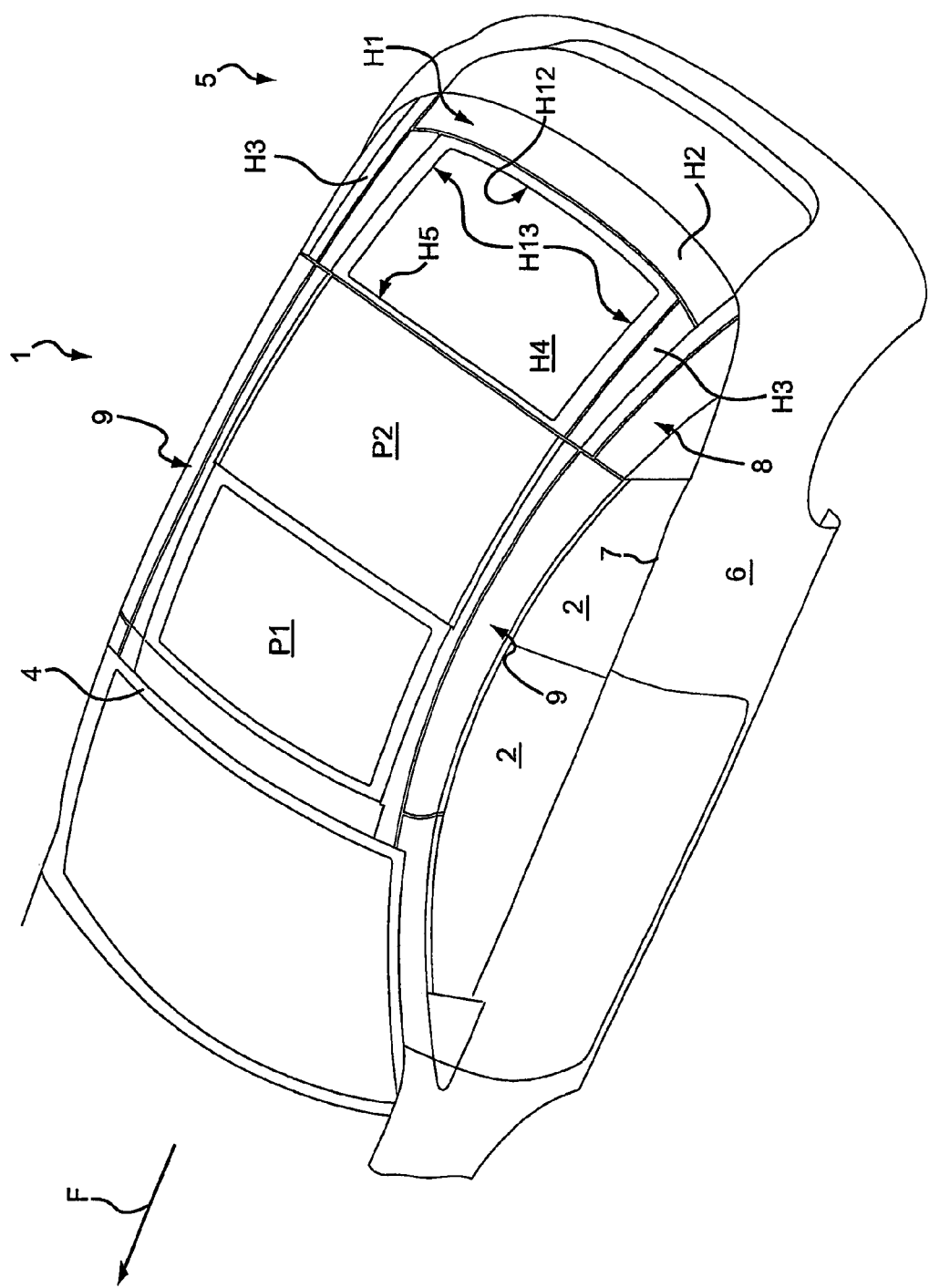

| | | |
|---|---|---|
| 6,325,445 B1 | 12/2001 | Schenk |
| 6,378,932 B1 | 4/2002 | Fasel et al. |
| 6,578,899 B2 * | 6/2003 | Hasselgruber et al. . 296/107.08 |
| 6,585,307 B1 * | 7/2003 | Queveau et al. ............ 296/76 |
| 6,824,194 B2 | 11/2004 | Weissmueller et al. |
| 7,178,852 B2 | 2/2007 | Obendiek et al. |
| 2003/0218355 A1 | 11/2003 | Stenvers et al. |
| 2004/0256885 A1 | 12/2004 | Bui |
| 2005/0029833 A1 | 2/2005 | Obendiek |

FOREIGN PATENT DOCUMENTS

| | | |
|---|---|---|
| EP | 1074415 A2 | 2/2001 |

\* cited by examiner

MOTOR VEHICLE WITH A HATCHBACK AND OPENING ROOF PART

The invention relates to a motor vehicle with a hatchback comprising a rear window in at least one position according to the preamble of Claim 1.

Numerous vehicles are known that have a hatchback provided with a rear window and can swing around an axle that is placed in the front and upper area. In this case, the lid is frequently connected by way of swan-neck shaped arms to the actual swivel axle and therefore goes further forward with its front when swinging further forward.

However, this can be an obstacle if roof parts to be opened are placed further forward on the roof that can collide with the opening hatchback.

The invention is based on the problem of allowing the largest possible roof opening in vehicles while still having a space-saving storage option in the body of the roof parts to be opened.

The invention solves this problem with a motor vehicle that has the characteristics of Claim 1. Reference is made to the other Claims 2 to 10 with regard to other advantageous designs.

With the invention, a large passageway can be opened up when the hatchback is opened, through which both front roof parts and also the rear window can be transferred into the body and that is still covered in a visually pleasing way when the rear window is closed.

In particular, when the lateral frame parts of the hatchback in their closed position lie flush with the roof members of the vehicle that follow in the direction of travel and run above the side windows; with the hatchback closed the passageway cannot be noticed at all.

In this case, it is advantageously possible that the passageway is enlarged in comparison to the inner width between the roof members in vehicle transverse direction, so that the roof parts to be lowered can have a very large width and can also be lowered with lateral guide rail sections into the body. If the roof parts are transparent for this purpose, a very light open feeling of space results even when they are in closed state.

In spite of the lateral expansion of the passageway, even with a rear window that can be lowered separately in released position and lateral frame parts of the hatchback closed over it, the edges of the rail and of the lateral frame parts of the hatchback turned toward a vertical vehicle longitudinal center plane advantageously lie flush following each other so that even then, no gradation can be seen in the lines running longitudinally over the vehicle.

In order to maintain the luggage compartment, it is especially advantageous if the rear window is held almost vertical in disengaged position, say behind the backrests of a rear bench seat.

With a design of the hatchback that is essentially U-shaped outside the rear window, in when the window is disengaged, the hatchback can form a large opening that goes through to the front and is not interrupted by a cross member. The open air feeling is especially pronounced in this case.

Other advantages and characteristics of the invention can be seen from the embodiment examples of the invention that are shown at least schematically in the drawings and described in the following.

Figure 2:
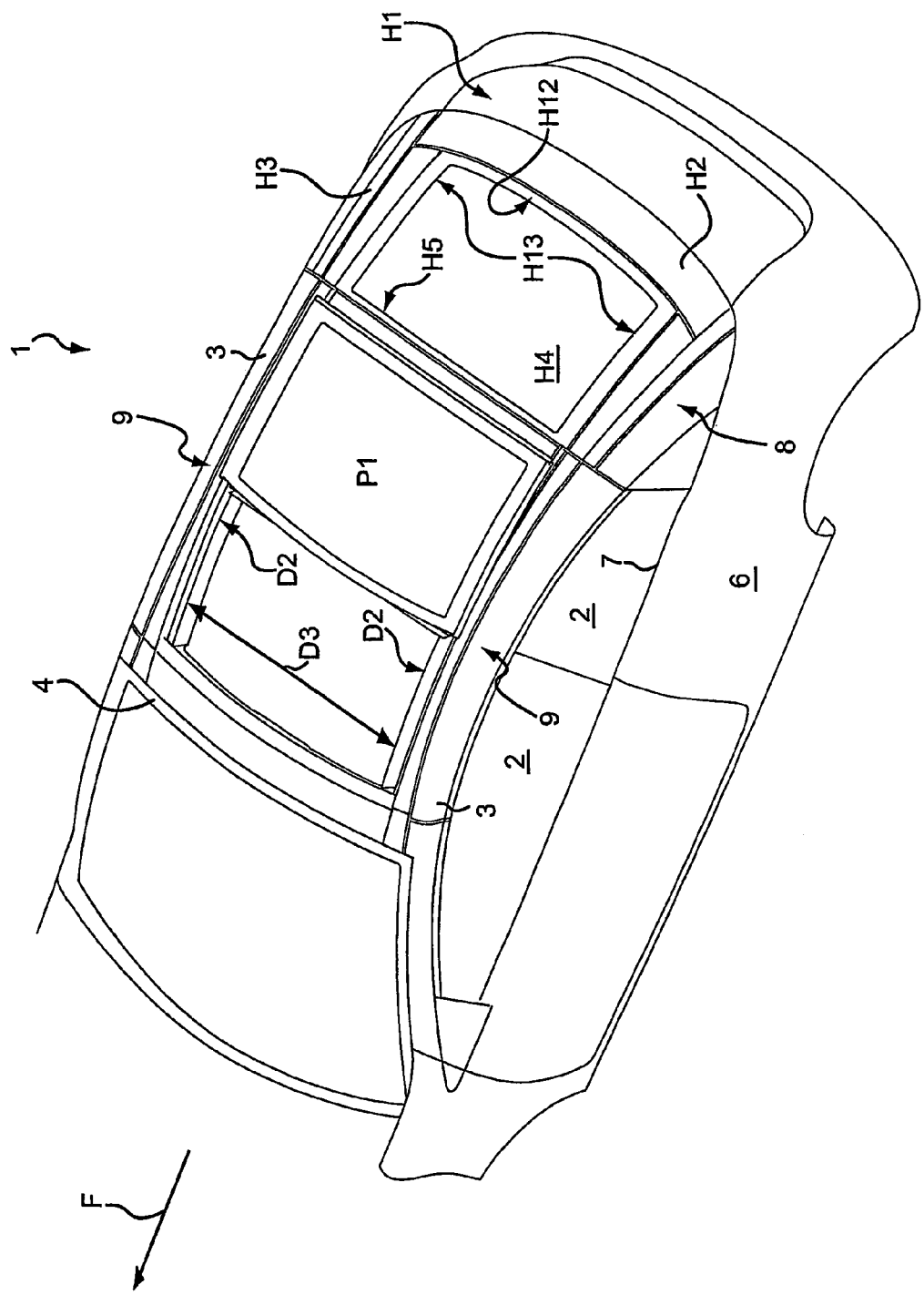
Figure 3:
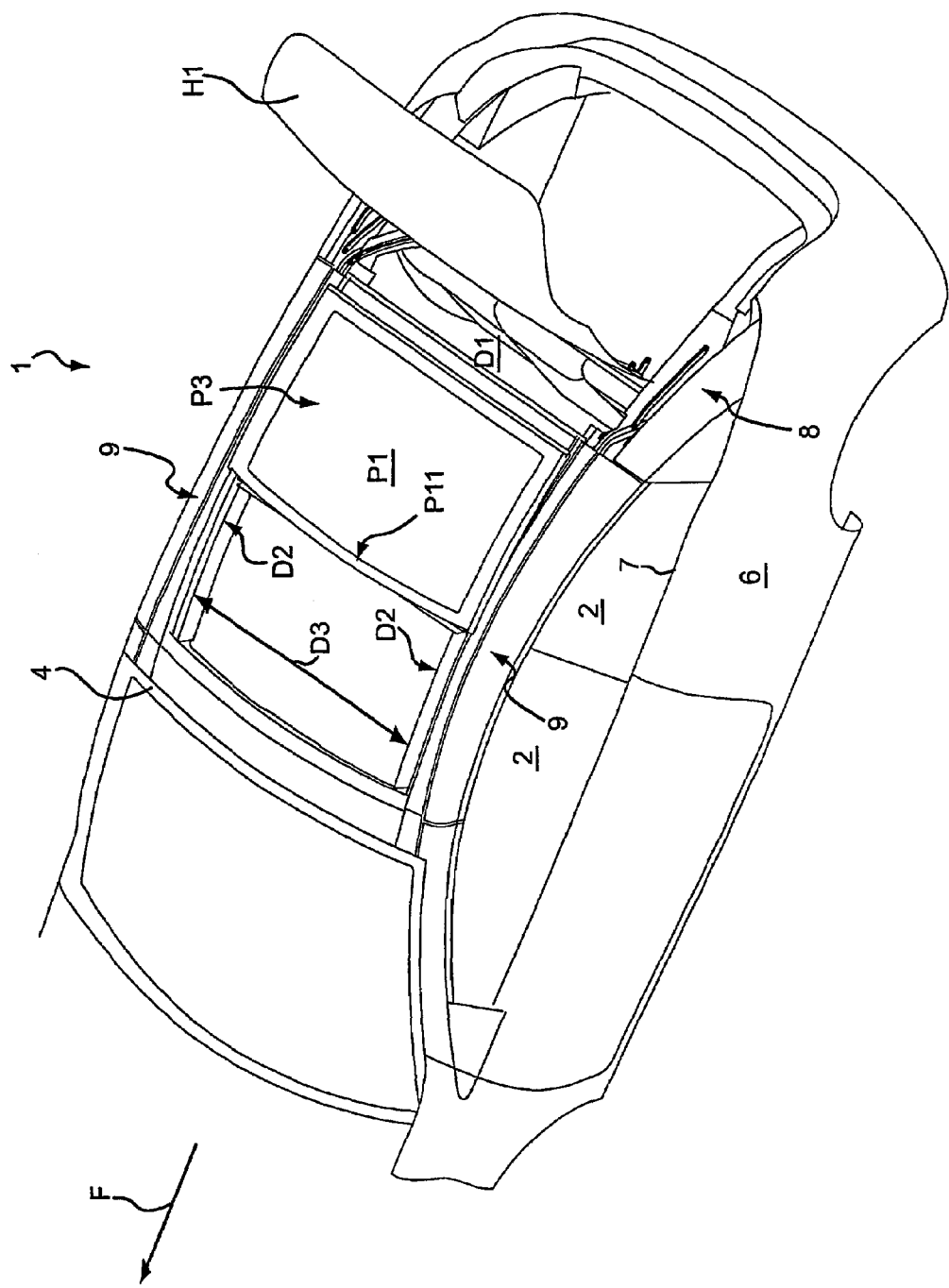
Figure 4:
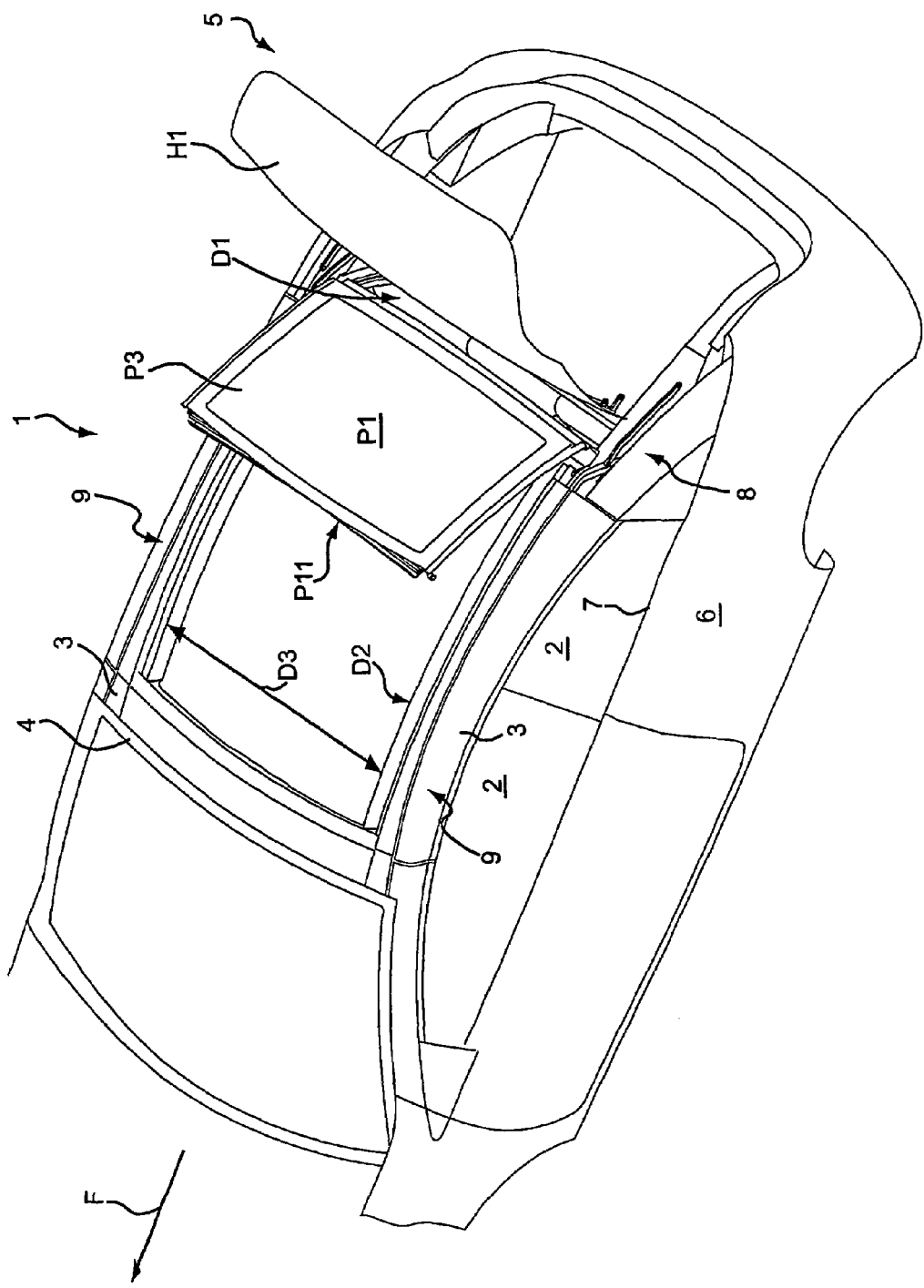
Figure 5:
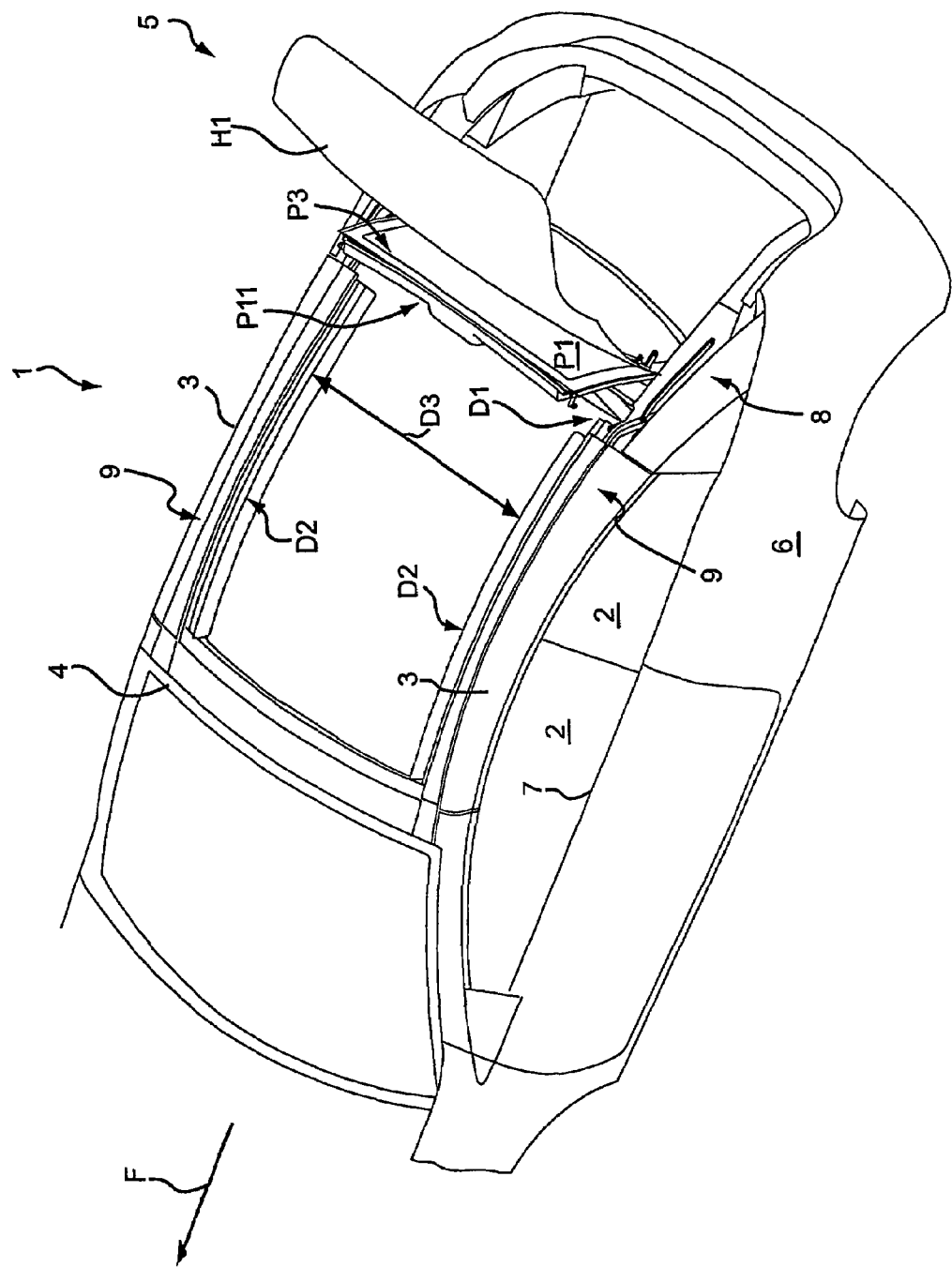
Figure 6:
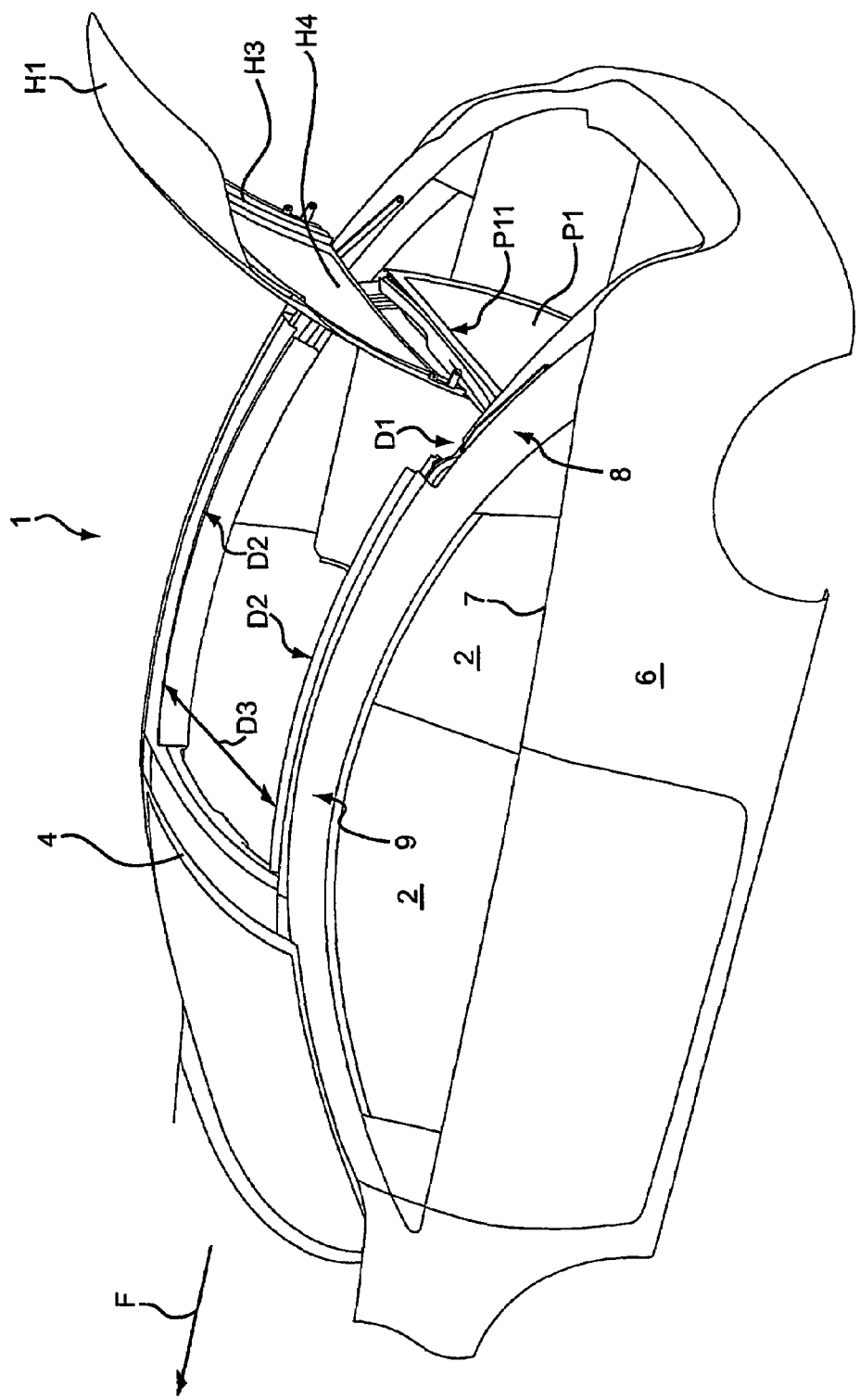
Figure 7:
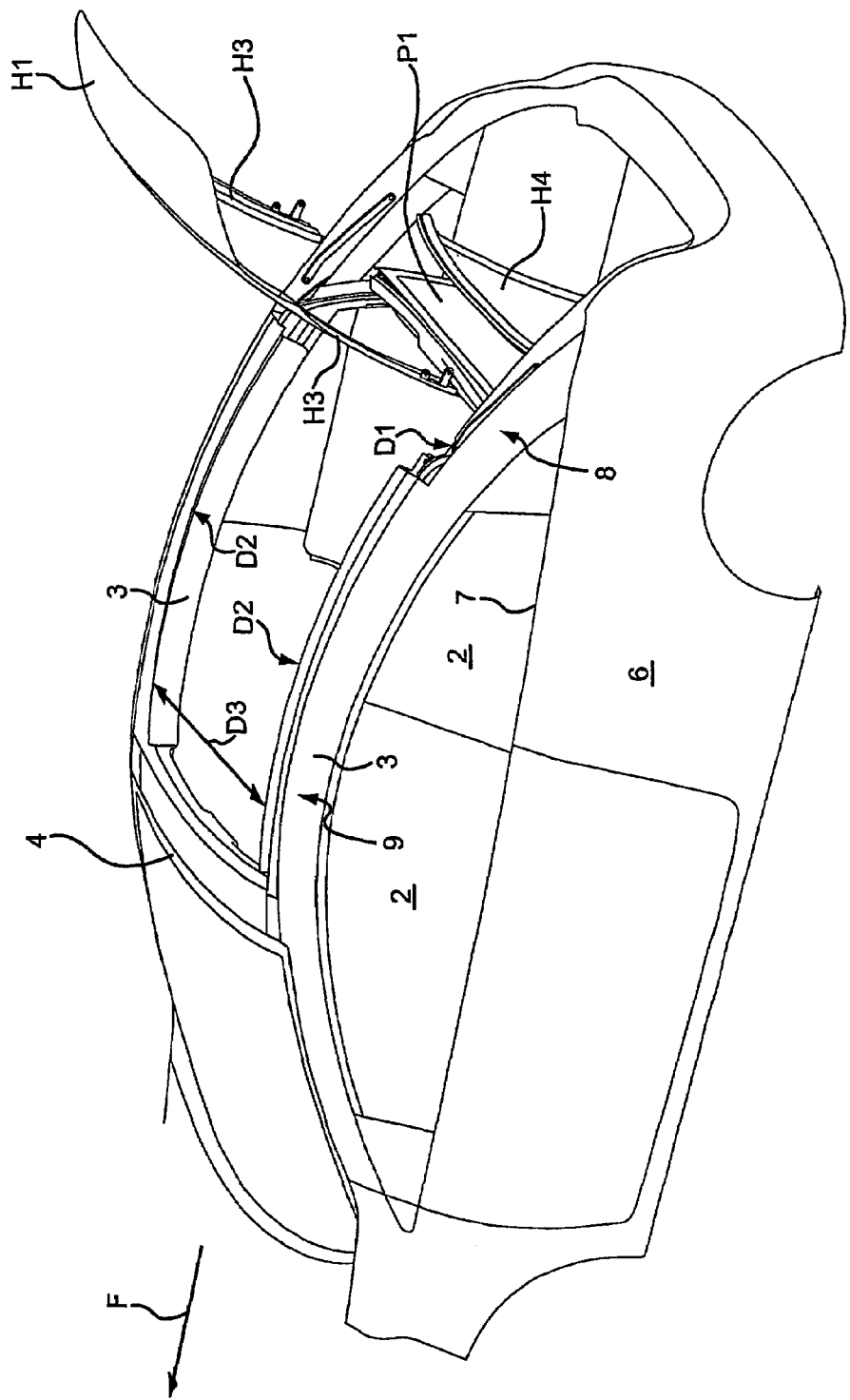
Figure 8:
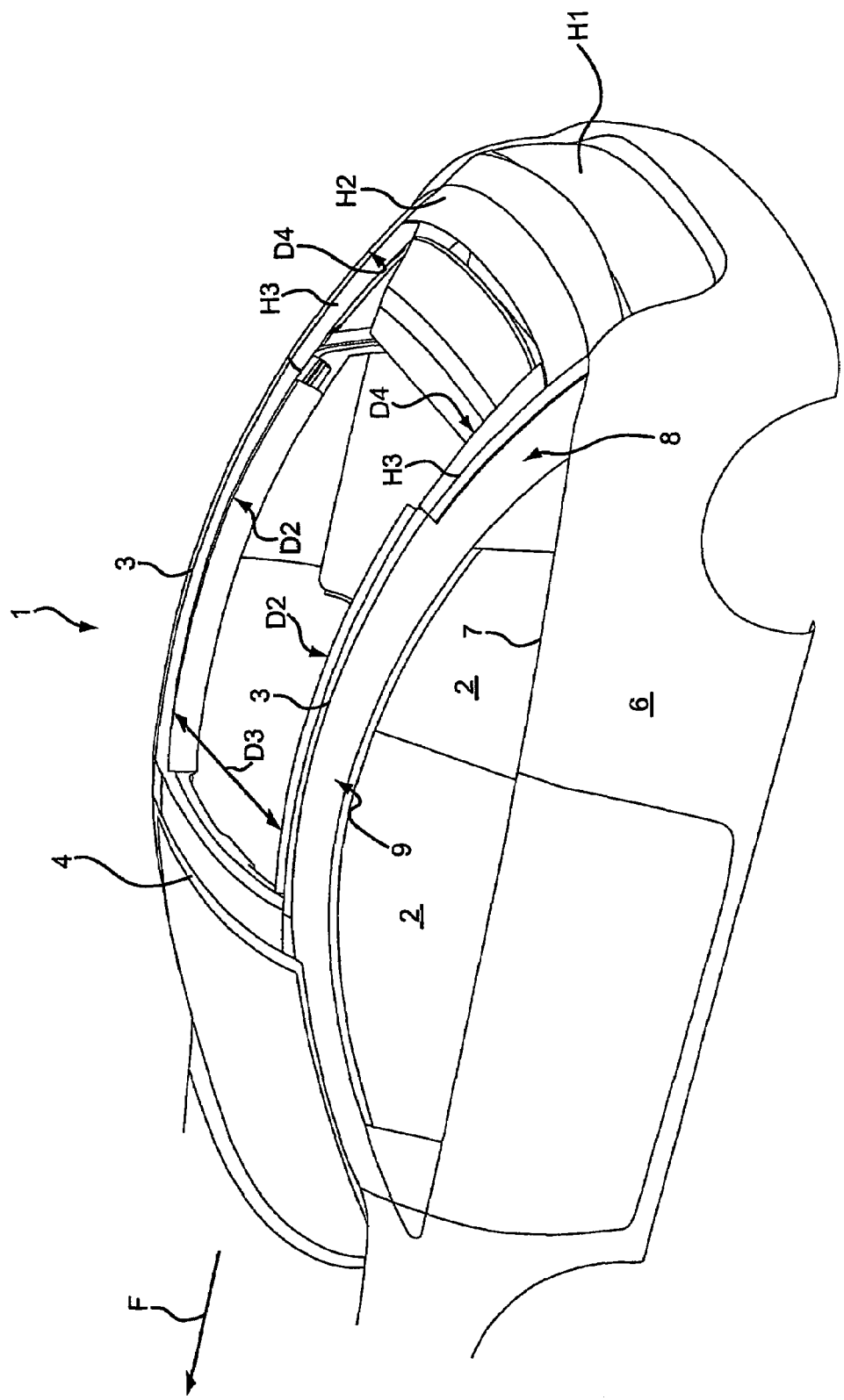
Figure 9:
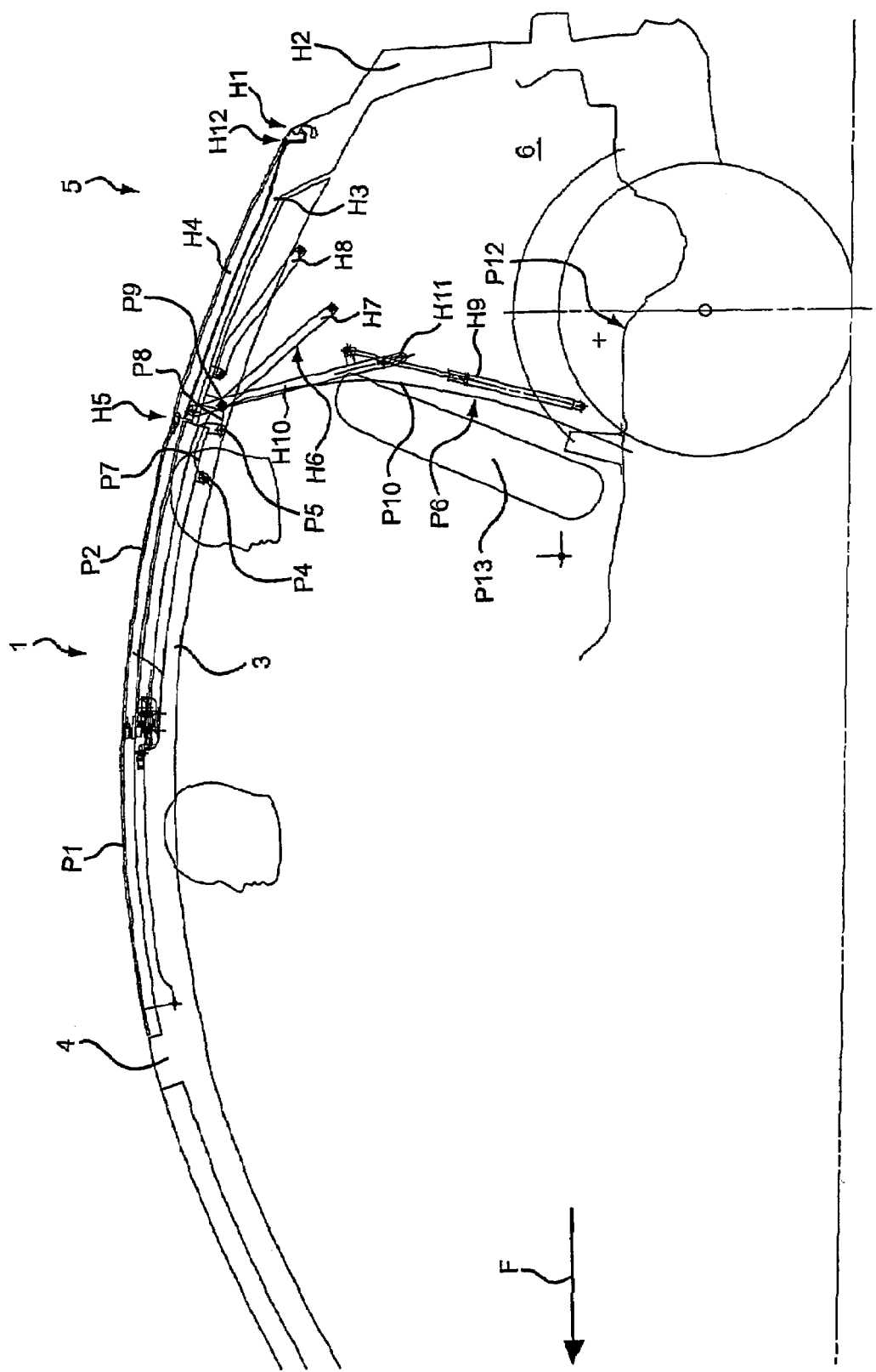
Figure 10:
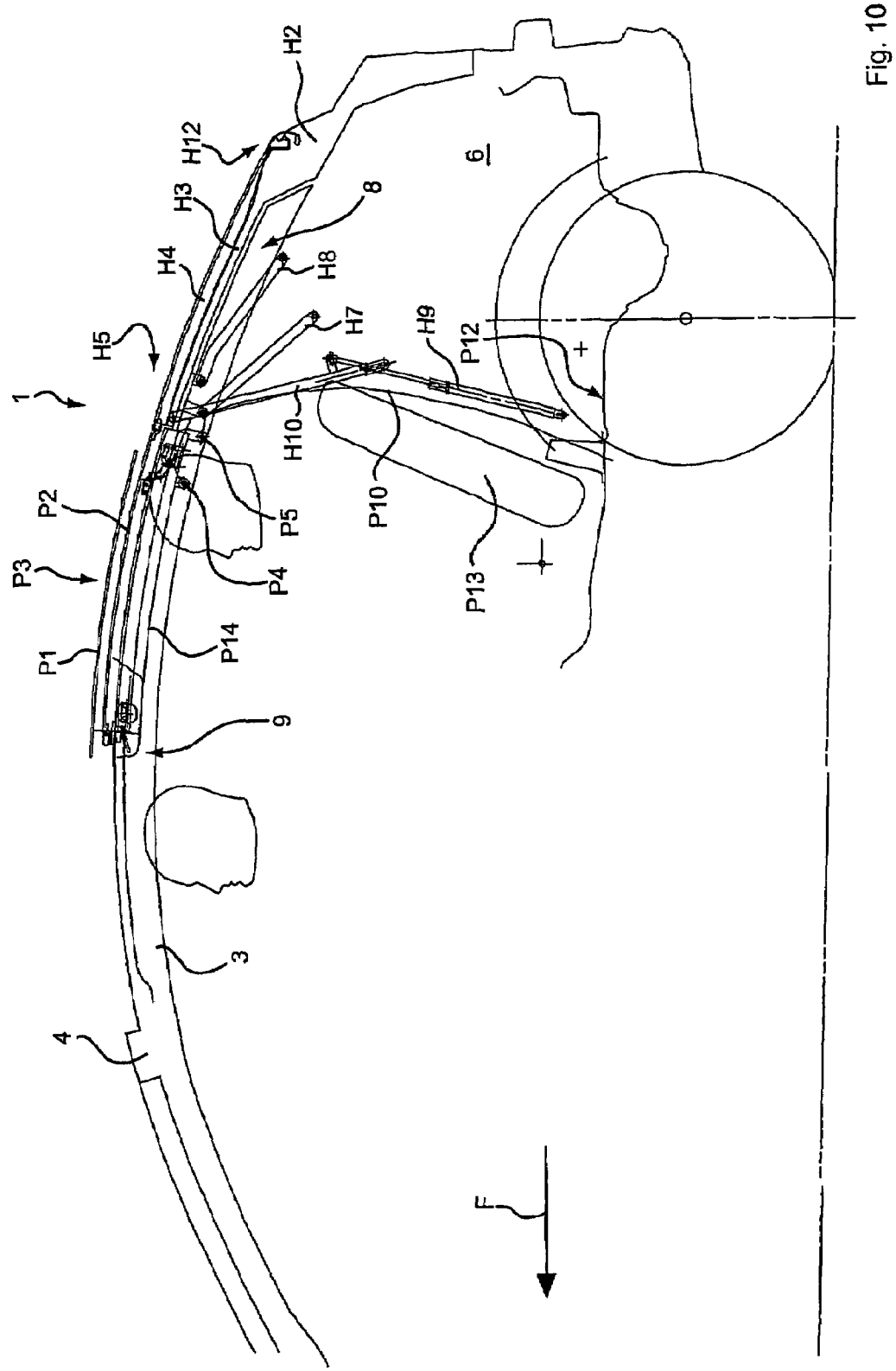
Figure 11:
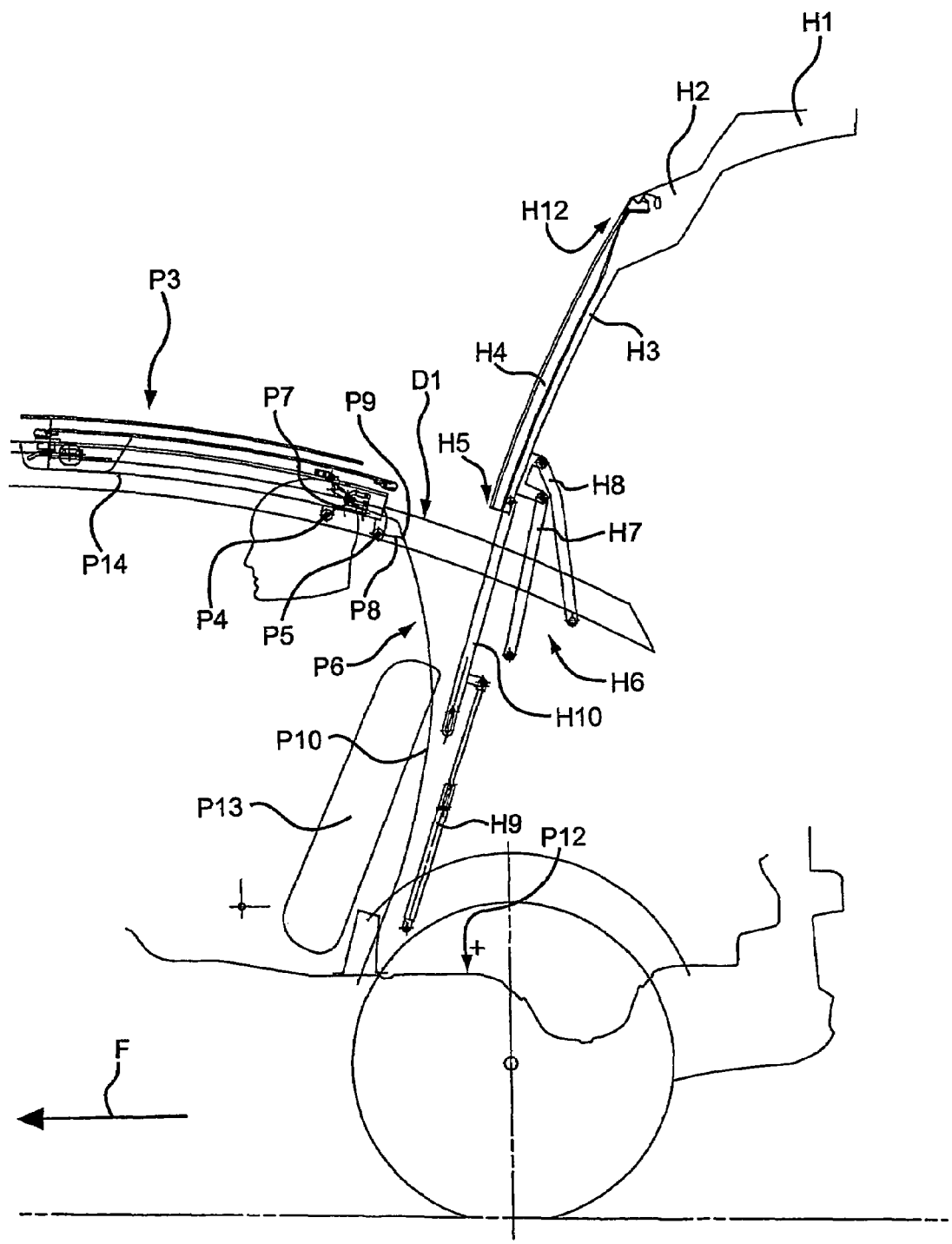
Figure 12:
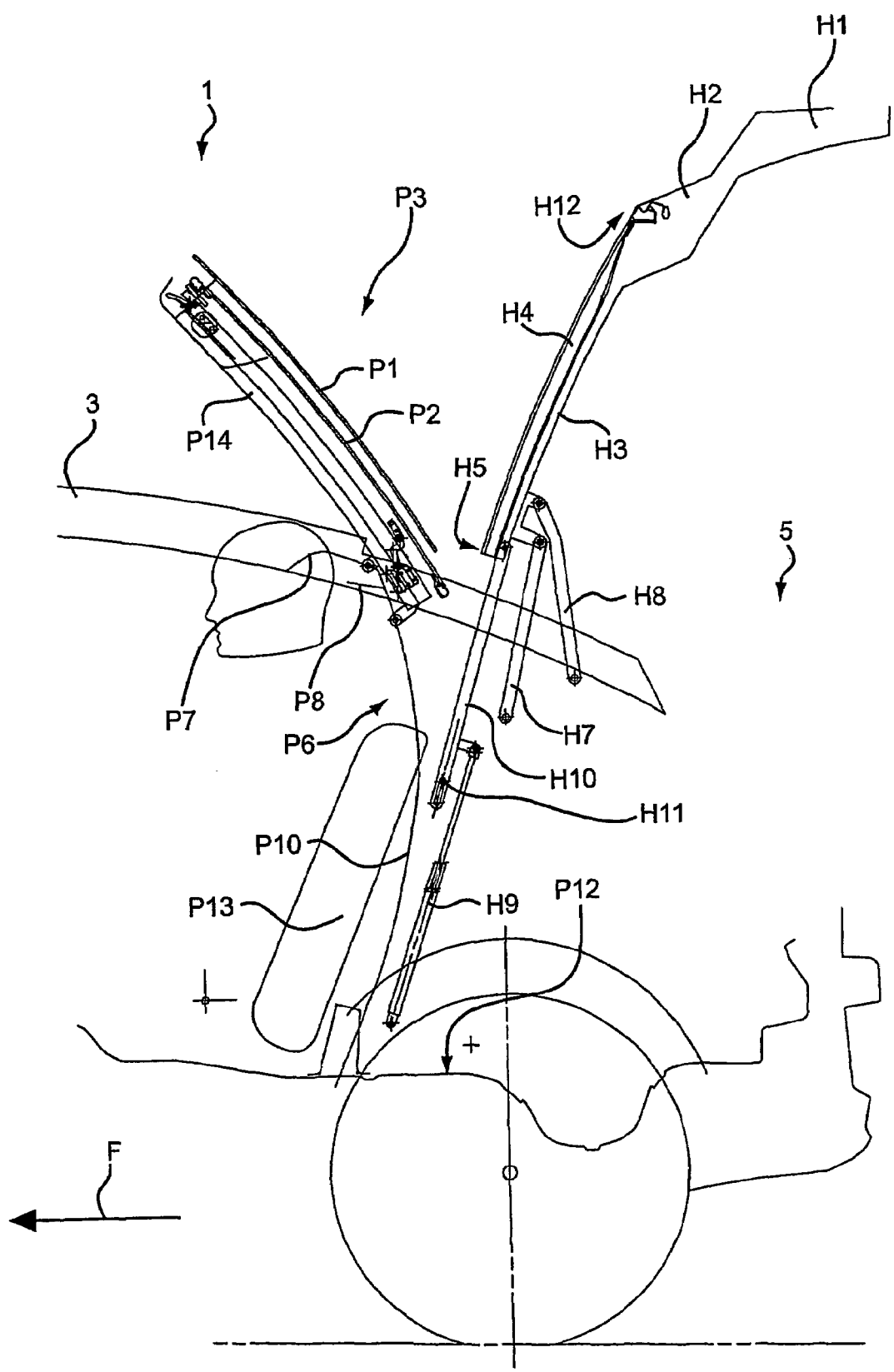
Figure 13:
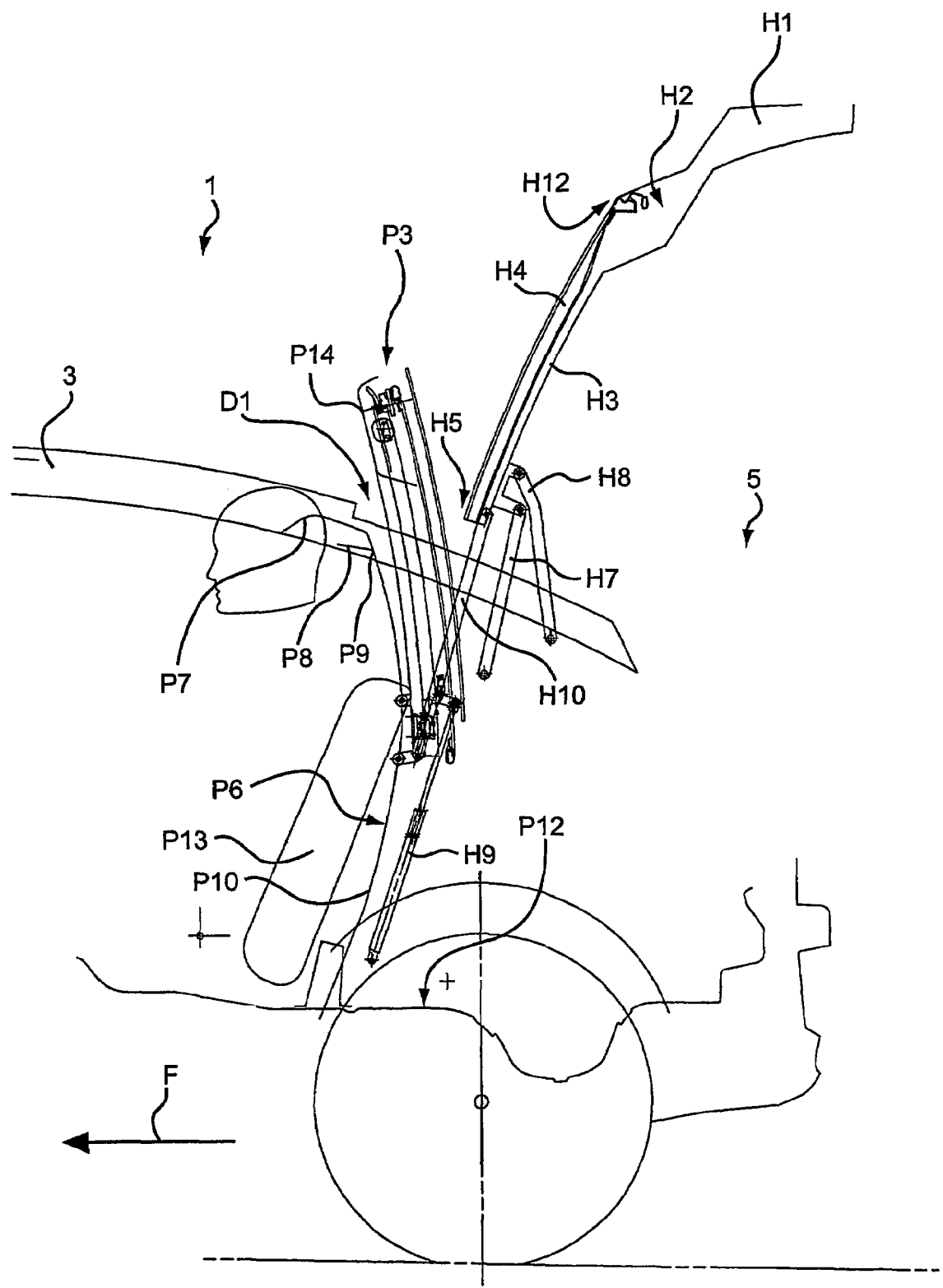
Figure 14:
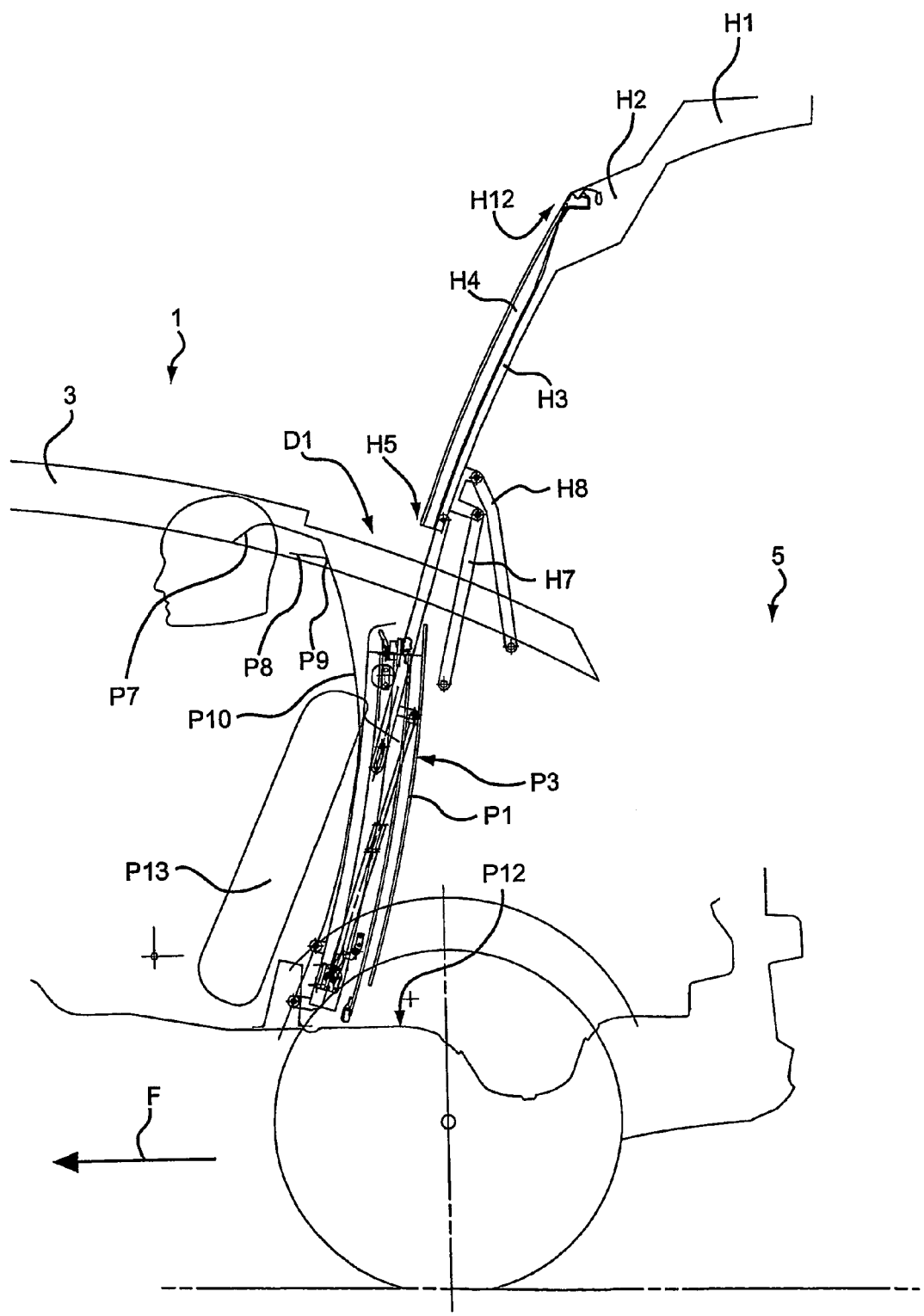
Figure 15:
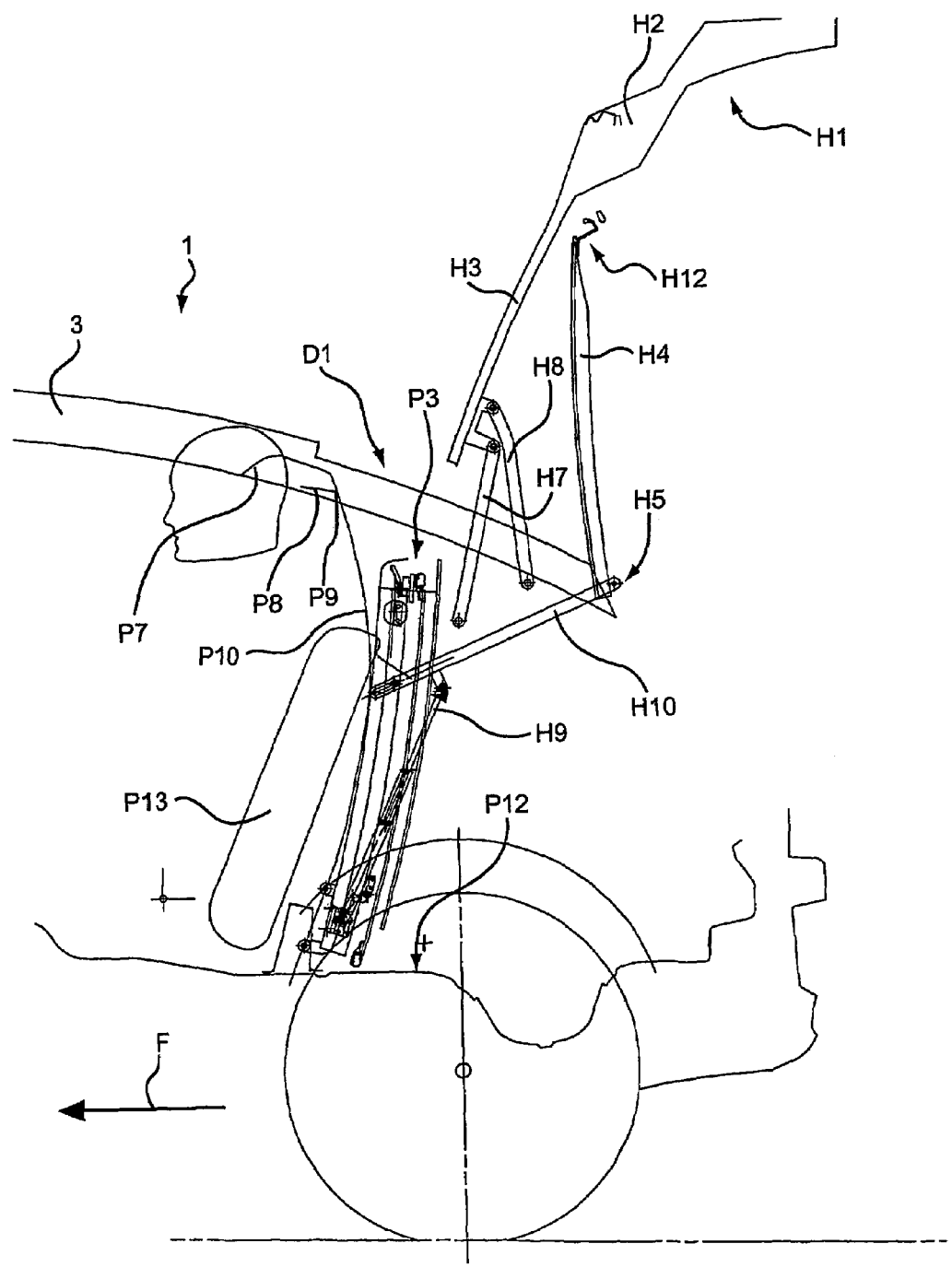
Figure 16:
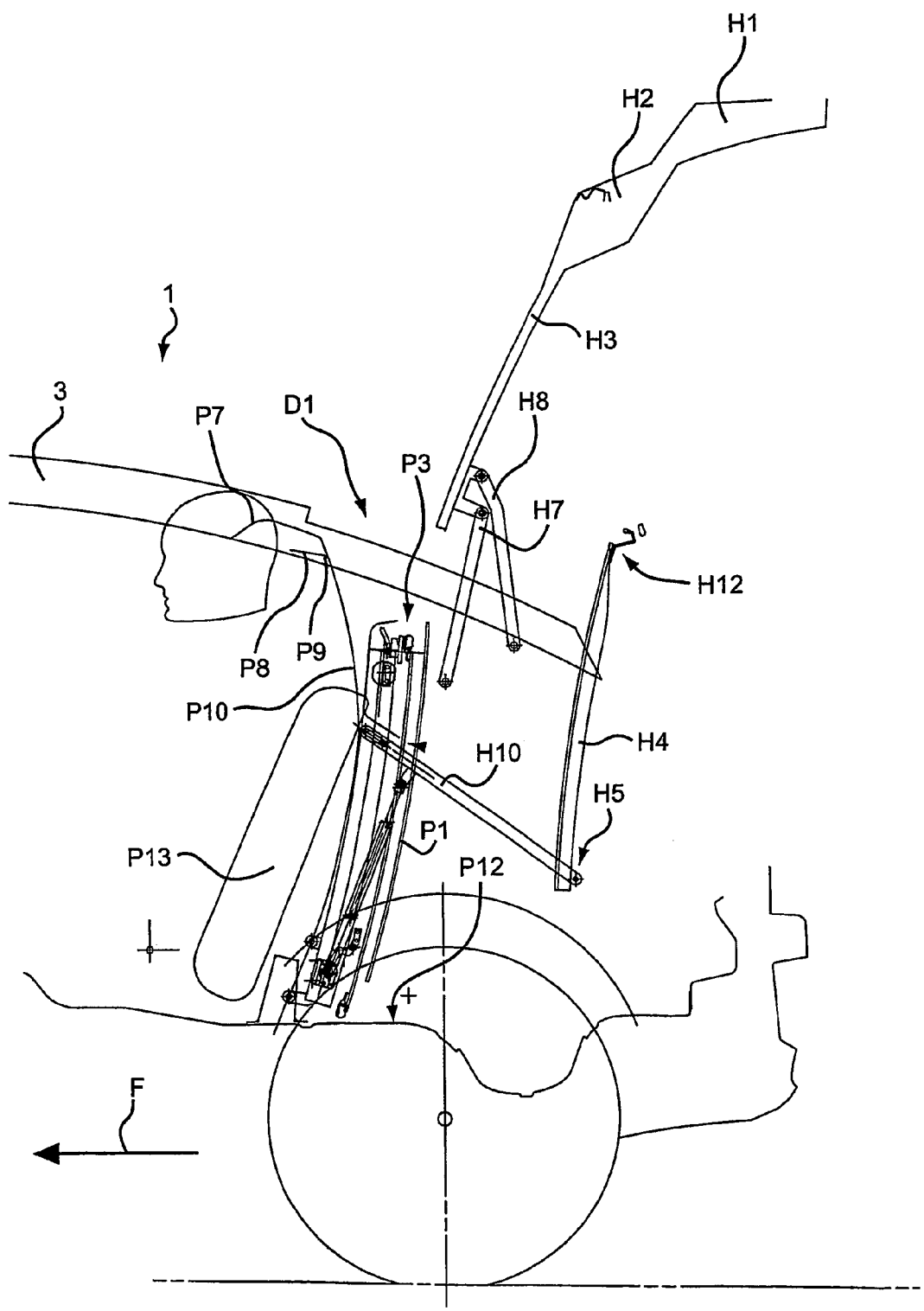
Figure 17:
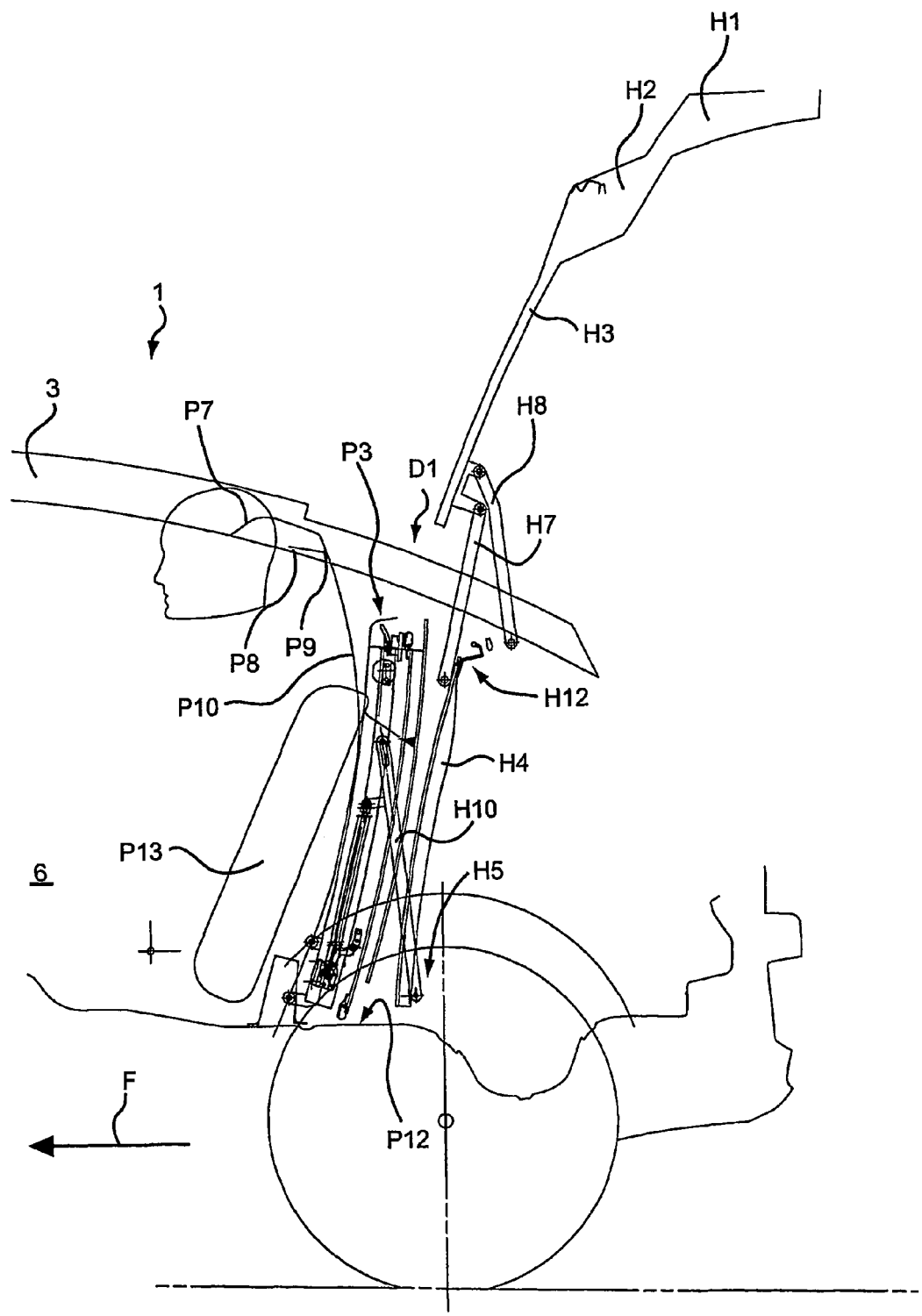
Figure 18:
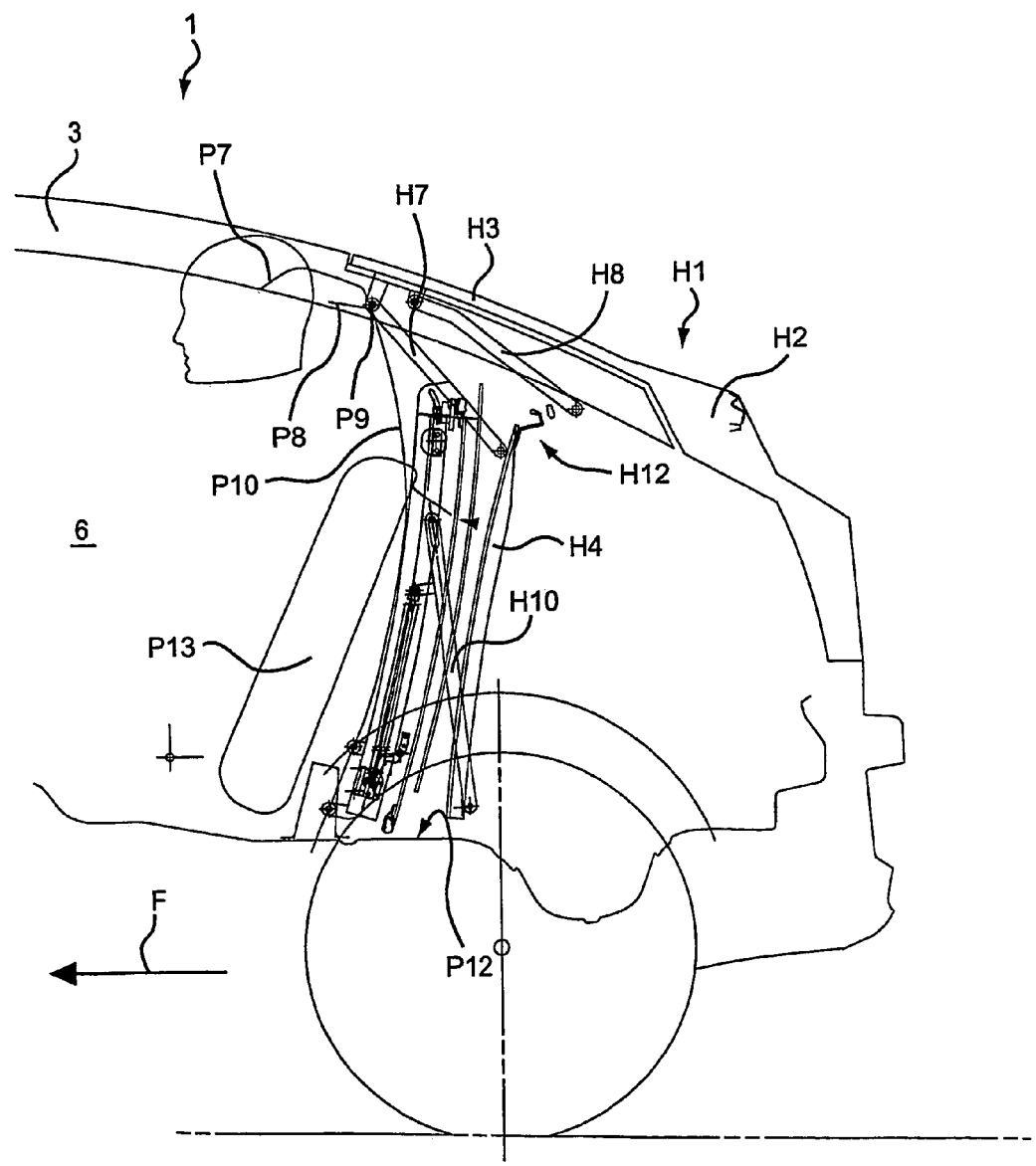

The drawings show:

FIG. 1 shows a motor vehicle according to the invention in perspective view diagonally from the rear with a closed rear window and a hatchback in closed position, as well as two other movable panel parts on the upper, and in direction of travel front edge, FIG. 2 shows a view similar to FIG. 1 after opening of the most forward-lying panel part, FIG. 3 shows a view similar to FIG. 2 with hatchback in open position, FIG. 4 shows a view similar to FIG. 3 during the opening of the two front panel parts, FIG. 5 shows a view similar to FIG. 4 with further progressed opening of the front panel parts, FIG. 6 shows a view similar to FIG. 5 with front panel parts stored essentially vertically in the body, FIG. 7 shows a view similar to FIG. 6 with rear window additionally in disengaged position stored in the body, FIG. 8 shows a view similar to FIG. 7 after the hatchback is closed, FIG. 9 shows a schematic side view of the vehicle with the roof position according to FIG. 1, FIG. 10 shows a view similar to FIG. 9 but after opening of the most forward-lying panel part with the roof position according to FIG. 2, FIG. 11 shows a view similar to FIG. 10, but with hatchback in open position with the roof position according to FIG. 3, FIG. 12 shows a view similar to FIG. 11, but during opening of the two panel parts with the roof position according to FIG. 4, FIG. 13 shows a view similar to FIG. 12, but during the further-progressed opening of the front panel parts with the roof position according to FIG. 5, FIG. 14 shows a view similar to FIG. 9 but with completely opened front panel parts with the roof position according to FIG. 6, FIG. 15 shows a view similar to FIG. 14, but while the rear window is being swung out from its closed position in the hatchback, FIG. 16 shows a view similar to FIG. 15 with further-progressed opening of the rear window, FIG. 17 shows a view similar to FIG. 16 with rear window located completely in disengaged position as in the position according to FIG. 7, FIG. 18 shows a view similar to FIG. 17 after closing of the hatchback as in the position according to FIG. 8.

In the drawings, a motor vehicle 1 with four or five seats, generally provided with a rear seat bench, is shown. This is not mandatory. For example, a two-seater can also be designed according to the invention.

Above side windows 2, the vehicle 1 comprises rigid roof members 3, which in the view from above essentially run longitudinally to the vehicle elongation and between a windshield frame 4 and the rear area 5 of the vehicle and in an arc shape in the side view. These are components of the vehicle body 6.

In the rear vehicle area 5, a hatchback H1 is provided. This is designed here essentially with U shape with a lower transverse leg H2, which can comprise e.g. parts of the rear lights and/or a license plate holder and with side legs H3, which in closed position of the hatchback H1 point forward and upward in direction of travel F according to the curve of the roof members 3. Between the parts H2 and H3, in its closed position, there is a rear window H4, especially a rigid one, which can consist e.g. of plastic or advantageously of glass. In this position, the side legs H3 thus serve as side frame parts of the rear window H4. In this case, the upper and front edge H5 of the rear window H4 in direction of travel F simultaneously also forms the upper and lower edge of the hatchback H1 and has no cross beam lying under it because of its U shape.

Overall, the hatchback H1 is held at the body 6 so it can be moved between a closed (FIG. 1) and an open position (FIG.

3). The opening movement is not purely a swivel movement, but occurs in such a way that in its open position, the front edge H5 of the hatchback H1 is definitely moved toward the back in comparison to its closed position, especially by more than 20 centimeters. To do this (FIG. 9 and the following), the hatchback H1 is held by a multi-link connector, in this case a four-link connector H6. Its control arms H7 and H8 are each hinge-mounted on the sides in the vehicle 6, i.e. in the rear area of the roof members 3. On their rear sections 8, the side frame parts 3 lie against the hatchback H1 in closed position.

From the open position of the hatchback H1 shown in FIGS. 3 and 12, the rear window H4 can be lowered into a separate disengaged position in the vehicle body 6.

To do this, the rear window H4 is connected to body 6 by rod parts H9, H10 mounted on it. In this case, the rod part H9 is a cylinder that can drive in and out, which because of its length variability is able to travel along with the opening movement of the hatchback H1 that then surrounds the rear window H4, even if it is closed (transition from FIG. 1 to FIG. 3).

One end of the cylinder H9 is attached to the body 6. With its free end, it engages with the control arm H10 that is mounted further up on the body 6, whereby this engagement point for the mounting H11 of control arm H10 lies at a distance, and thus a lever arm results.

With its free end, the control arm H10 engages on the side of the upper edge H5 of rear window H4.

In order to transfer it to disengaged position, first the end H12 of the rear window H4 that forms the lower edge in closed position is unlocked from the center leg H2 of hatchback H1 (transition from FIG. 14 to FIG. 15), whereby for manual operation, the window H4 can be held by the user at its side edges H13 and can be moved almost parallel downward (FIG. 16). In this process, the lever H10 is swiveled downward around hinge H11 and the cylinder H9 drives in and swings forward. In this way, the rear window H4 is at least almost vertical overall and stored in a space saving manner moved toward the front, in this case in a stack with other roof parts, which will be explained in more detail below.

In this disengaged position (FIG. 17), the rear window H4 is held at a distance from the hatchback H1 below a lateral window apron line 7 of body 6. The space between the side legs H3 and the lower transverse leg H2 of the hatchback H1 is opened completely. This can then be closed again (FIG. 18).

In closed position of the rear window H4 (FIG. 1), motor vehicle 1 comprises other panel parts P1, P2 on its front edge H5 and toward the front in direction of travel F. Their number varies depending on the roof length; in the closed position, they lie essentially horizontal, flush in succession, as well as flush to the rear window H4 and support themselves directly or indirectly on the lateral roof members 3. The roof parts P1 and P2—in this case two—can be made of different materials, e.g. metal, glass or plastic materials. In particular, they can be made so that they are essentially transparent. In this case it is recommended that roof parts P1, P2 are not allowed to be too narrow in vehicle longitudinal direction in order to largely prevent shadow strips in the interior. Therefore a minimum extension of 40 cm in vehicle longitudinal direction is advantageous.

From the closed position, the front roof part P1 can be moved over the roof part P2 lying behind in it the manner of a sunroof and in open position, lies essentially parallel to it (FIG. 2 and the following). The position of roof parts P1, P2 produced in this way represents a possible permanent driving position. However, from it, a further roof opening can also occur with downward displacement of the roof parts P1 and P2 lying over each other as a stack P3, in order to lower this inside the body 6.

To do this, the roof part stack P3 formed in this way is supported in a lateral guide rail P6 in the rear area of the rear roof part P2 by way of two guide rollers P4, P5 lying in succession.

At the beginning of storage of the roof part stack P3 in the body 6 (transition from FIG. 11 to FIG. 12), the front P4 of the two rollers runs toward the back on a guide track section P7 that is oriented upward, while on the other hand the rear guide roller P5 first runs in a guide track section P8 that runs almost horizontal. Section P8 opens out at point P9 to the slightly curved section P10 of guide rail P6 that runs downward.

Because of the slope of section P7 oriented upward toward the back, with the beginning movement of the roof part stack P3, its front edge P11 is lifted immediately, whereby the head room for the passengers sitting in the rear does not decrease below the dimension that is present with closed roof parts P1, P2 in any phase of the movement. This is a decisive advantage.

When the rear guide roller P5 enters into section P10, the front guide roller P4 runs into a section of the guide track P6 following the side roof members 3, whereby during the almost vertical downward movement of the rear guide roller P5, the sloped position of the roof stack P3 is further increased and this is also almost vertical during entry of the front guide roller P4 into the section P10 (FIG. 13). In this position, it can glide downward to the inner vehicle floor P12 and stand almost vertical in a space-saving manner, e.g. behind the backrests P13 of the second seating row (FIG. 14).

The closing of the roof parts P1, P2 occurs in a corresponding way in reverse, whereby the head room does not drop below the dimension that is present when the roof parts are closed in any phase in the movement. The vehicle silhouette can thus be kept very flat and sporty.

If the front roof part P1 ends directly at the windshield frame 4, a very large roof opening can be produced. Also, the side body areas 3 above the side windows can be designed so that they are very narrow, so the width of the panel parts P1 and P2 can extend almost to the upper edge of the side windows.

In order to make the storage of roof parts P1 and P2 easier, the hatchback H1 opens, as already described above, in such a way that in its open position, the front edge H5 is moved toward the back in comparison to the closed position. Because of this, in direction of travel F, a passageway D1 results in front of the open hatchback H1, which lies completely behind the rear edge of the rear roof part P2 in closed state. In this way, the storage path for the roof part stack P3 that extends through the vehicle interior is moved far toward the back in the vehicle 1. Any passengers that may be sitting on a rear seat bench will not be disturbed by this. In any case, the storage path for the roof part stack P3 lies behind the passengers, even in the possible case of a two-seater. The head room of the passengers is not restricted because of the roof part storage.

In this case, with the hatchback H1 in closed state, the frame parts H3 surrounding the rear window H4 on the sides lie flush with the areas 9 of the roof members 3 following toward the front in direction of travel, which is very advantageous visually. In particular, no gradation is necessary in the inner edge D2 of the named parts H3, 3 turned toward the rear window H4 and/or the moving roof parts P1, P2. Rather this edge D2, with its continuation D4, runs in a straight line over the entire interior (FIG. 8). The flush position of the inner edges D4 of the side frame parts H3 of hatchback H1 and the inner edges D2 of roof members 3 turned toward the vertical vehicle longitudinal center plane is especially advantageous visually during lowering of all the roof parts P1, P2, H4. The large roof opening that thereby occurs thus has a visually continuous longitudinal edge area.

Still, during opening of the hatchback H1, a passageway D1 is released that is wider than the inner width D3 between the inner edges D2 is. Because of this, the roof parts P1 and P2 can be designed so that they are very wide. For example, a guide rail P14 extending laterally beyond the roof part P2, in which the front roof part is guided in its open position can also go into the interior of the body 6 with the roof stack P3 through the passageway D1 that is widened in comparison to the inner width D3.

To open the two parts P1 and P2 and the rear window H4, first the hatchback H1 is opened in order to open up the passageway D1. Then the roof parts P1, P2 can be opened in the way described above.

Before or after that, from the open position of the hatchback H1, the rear window H4 can also be released from the surrounding parts H2, H3 in one of the ways described and stored in a space-saving position parallel to the roof parts P1 and P2 in the interior. It is also possible that either only the rear window H4, only the front panel part P1, the rear window H4 and the panel part P1 or only the front roof parts P1 and P2 will be opened, as desired.

The invention can also be used for vehicles with manually moved roof parts P1, P2, H4, as well as with completely or partially automatic movement of the parts.

The invention claimed is:

1. A motor vehicle having a movable hatchback, comprising:
   at least one roof panel;
   a first roof member positioned at a first side of the vehicle and a second roof member positioned at second side of the vehicle, each of the roof members having a back section extending to a rear of the vehicle;
   a first side frame part positioned at the first side of the vehicle and a second side frame part positioned at the second side of the vehicle; and
   a rear window capable of being positioned between the first and second side frame parts,
   wherein the first side frame part is positioned against the back section of the first roof member and the second side frame part is positioned against the back section of the second roof member such that the first and second side frame parts form a part of the external surface of the vehicle when the hatchback is in a closed position, and
   during an opened position, a portion of the hatchback is moved opposite the direction of travel and opens up a passageway for allowing the at least one roof panel to be lowered into the body of the vehicle to an area covered when the hatchback is in the closed position.

2. The motor vehicle according to claim 1, wherein the passageway allowing the at least one roof panel to be lowered into the body of the vehicle is expanded in a transverse direction to an inner width between the first and second roof members.

3. The motor vehicle according to claim 2, wherein an inner edge of the first and second roof members and an inner edge of the first and second side frame parts lie flush in succession when the rear window is in a disengaged position and that hatchback is in the closed position.

4. The motor vehicle according to claim 3, wherein the at least one roof panel is capable of being stored in body of the vehicle when the hatchback is in the closed position with the rear window positioned between the first and second side frame parts.

5. The motor vehicle according to claim 4, wherein a length of the passageway in the vehicle longitudinal direction is at least 20 cm.

* * * * *